(12) United States Patent
Chapman et al.

(10) Patent No.: US 7,874,504 B2
(45) Date of Patent: *Jan. 25, 2011

(54) CHIPPER FEED MECHANISM AND THROAT OPENING SENSOR FOR USE THEREWITH

(75) Inventors: Bruce G. Chapman, Wooster, OH (US); Mark A. Hartzler, Marshallville, OH (US); John J. Eglin, Ashland, OH (US)

(73) Assignee: Rayco Manufacturing, Inc., Wooster, OH (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/280,894

(22) Filed: Nov. 16, 2005

(65) Prior Publication Data

US 2007/0108323 A1    May 17, 2007
US 2009/0084876 A9    Apr. 2, 2009

Related U.S. Application Data

(63) Continuation-in-part of application No. 11/234,952, filed on Sep. 26, 2005, now Pat. No. 7,481,386.

(51) Int. Cl.
*B27L 11/02* (2006.01)
*B02C 25/00* (2006.01)
*B23Q 15/06* (2006.01)
(52) U.S. Cl. .............................. 241/28; 241/34; 241/92; 144/356; 144/392

(58) Field of Classification Search .................. 241/28, 241/30, 34, 35, 92; 144/356, 382, 392, 394, 144/402, 404
See application file for complete search history.

(56) References Cited

U.S. PATENT DOCUMENTS

| 5,072,887 | A * | 12/1991 | Thom, Jr. ..................... 241/37 |
| 5,205,496 | A * | 4/1993 | O'Donnell et al. ............ 241/34 |
| 6,474,579 | B1 * | 11/2002 | Bardos et al. .............. 241/88.4 |
| 6,830,204 | B1 * | 12/2004 | Morey ......................... 241/34 |
| 2003/0111566 | A1 | 6/2003 | Seaman et al. |
| 2007/0069051 | A1 * | 3/2007 | Hartzler et al. ................ 241/30 |

* cited by examiner

*Primary Examiner*—Debra M Sullivan
(74) *Attorney, Agent, or Firm*—Sand & Sebolt

(57) ABSTRACT

A wood chipper includes a cutting assembly and a feed wheel for feeding material through an adjustable throat opening adjacent the feed wheel and toward the cutting assembly. A throat sensor measures the size of the throat opening and an electronic control unit (ECU) controls operation of the wood chipper in accordance with the size of the throat opening. The ECU controls forward, reverse and non-rotation of the feed wheel as well as down pressure applied by the feed wheel on feed material moving through the throat opening. The feed wheel down pressure may be constant or vary in any number of ways. One option includes applying down pressure in a pulsating manner.

20 Claims, 14 Drawing Sheets

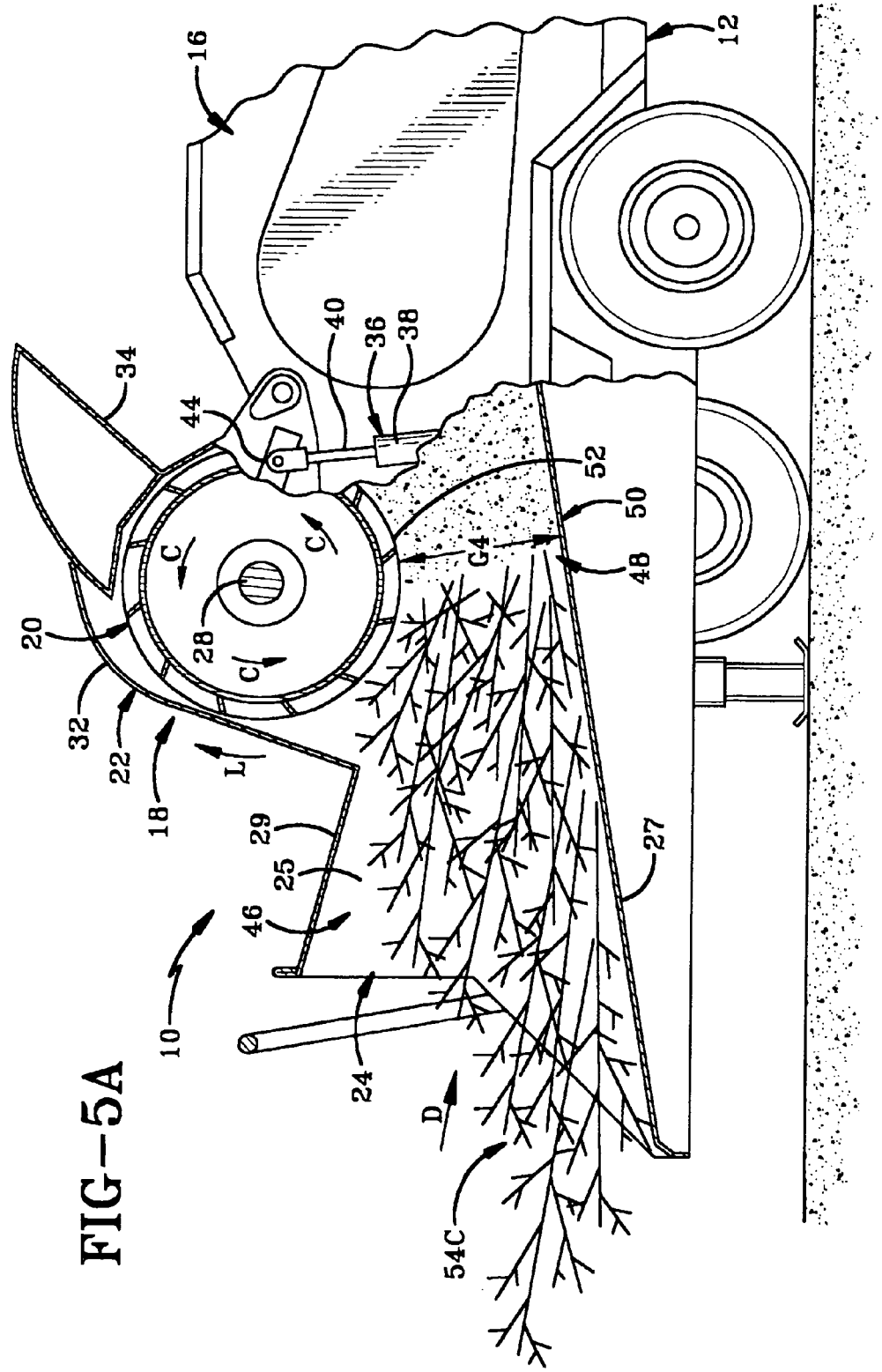

| THROAT OPENING SENSOR FEEDBACK | FORWARD FEED CYCLE TIME | REVERSE FEED CYCLE TIME | PAUSE (DWELL) CYCLE TIME | NORMAL DOWN PRESSURE | HIGH DOWN PRESSURE |
|---|---|---|---|---|---|
| 1" | CONTINUOUS | NOT APPLICABLE | NOT APPLICABLE | CONTINUOUS | NOT APPLICABLE |
| 2" | CONTINUOUS | NOT APPLICABLE | NOT APPLICABLE | CONTINUOUS | NOT APPLICABLE |
| 3" | CONTINUOUS | NOT APPLICABLE | NOT APPLICABLE | CONTINUOUS | NOT APPLICABLE |
| 4" | 10 SECONDS | 0.5 SECONDS | 4 SECONDS | CONTINUOUS | NOT APPLICABLE |
| 5" | 10 SECONDS | 0.5 SECONDS | 4 SECONDS | CONTINUOUS | NOT APPLICABLE |
| 6" | 9 SECONDS | 0.5 SECONDS | 4 SECONDS | 6 SECONDS | 1 SECOND |
| 7" | 9 SECONDS | 0.5 SECONDS | 4 SECONDS | 6 SECONDS | 1 SECOND |
| 8" | 8 SECONDS | 0.5 SECONDS | 4 SECONDS | 6 SECONDS | 1 SECOND |
| 9" | 8 SECONDS | 0.5 SECONDS | 4 SECONDS | 6 SECONDS | 1 SECOND |
| 10" | 7 SECONDS | 0.5 SECONDS | 4 SECONDS | 6 SECONDS | 1 SECOND |
| 11" | 7 SECONDS | 0.5 SECONDS | 4 SECONDS | 6 SECONDS | 1 SECOND |
| 12" | 6 SECONDS | 0.5 SECONDS | 4 SECONDS | 6 SECONDS | 1 SECOND |
| 13" | 6 SECONDS | 0.5 SECONDS | 4 SECONDS | 6 SECONDS | 1 SECOND |
| 14" | 5 SECONDS | 0.5 SECONDS | 5 SECONDS | 4 SECONDS | 1.5 SECONDS |
| 15" | 5 SECONDS | 0.5 SECONDS | 5 SECONDS | 4 SECONDS | 1.5 SECONDS |

FIG-7

CHIPPER FEED MECHANISM AND THROAT OPENING SENSOR FOR USE THEREWITH

This is a continuation-in-part of U.S. application Ser. No. 11/234,952, now U.S. Pat. No. 7,481,386 filed Sep. 26, 2005

BACKGROUND OF THE INVENTION

1. Technical Field

The invention relates generally to wood chippers. More particularly, the invention relates to a control system for controlling the feed wheel of a wood chipper wherein the feed wheel moves up and down to alter the size of a throat opening through which feed material is moved by the feed wheel. Specifically, the invention relates to such a control system having a throat sensor for determining the throat size and an electronic control unit for controlling rotation and down pressure of the feed wheel in accordance with the throat size.

2. Background Information

Typically, wood chippers include a feed chute, a rotating feed wheel and a cutting assembly whereby feed material is fed through the feed chute and drawn in by the feed wheel to the cutting assembly where the feed material such as branches and the like are cut by the cutting assembly. Some wood chippers utilize a single feed wheel while others utilize a pair of feed wheels which rotate in opposite directions to draw the feed material into the cutting assembly. Due to the various sizes of branches and logs that may be fed into a wood chipper, often the feed wheel or one of the feed wheels is movable in order to increase the size of the throat through which the feed material is drawn by the feed wheel. As disclosed in U.S. Patent Application Publication No. US2003/0111566 of Seaman et al., at least one wood chipper is known to have a feed control system which is hydraulically operated in order to provide additional pressure to the upper feed drum which corresponds to the pressure within the hydraulic motor which rotatingly drives the feed drum. Seaman et al. disclose a control system which when in automatic mode constantly urges the upper feed drum downwardly to apply a constant load to the feed material regardless of the position of the upper feed drum relative to the lower feed drum and thus regardless of the size of the gap between the two drums. The control mechanism of this wood chipper is entirely hydraulic in nature. More particularly, an increase in the load on the hydraulic motor which controls the upper feed drum causes an increase in the pressure of hydraulic fluid associated with the motor and this increased pressure of hydraulic fluid is directly applied to a hydraulic actuator to increase the down pressure on the feed drum. While this system has its advantages, it has also limited by the fact that the increased load on the feed wheel motor and thus the increased pressure on the hydraulic fluid can only be responded to by the increased down pressure of the feed drum. This control system is also operable in a manual mode in order to move the upper feed drum away from the lower feed drum to increase the gap to accommodate larger feed material or to provide additional down pressure on the feed drum when desired. Thus, while Seaman et al. provides certain advantages, there is still room for an improved feed mechanism for wood chippers.

BRIEF SUMMARY OF THE INVENTION

The present invention provides a method comprising the steps of moving feed material toward a cutting assembly of a wood chipper having a rotatable feed wheel via a gap which is adjacent the feed wheel, which is disposed between a first member and a gap-bounding member and which is adjustable by changing a distance from the first member to the gap-bounding member; determining the distance; and controlling at least one of the feed wheel and a structural member in light of the distance wherein the feed material passes between the feed wheel and the structural member.

BRIEF DESCRIPTION OF THE SEVERAL VIEWS OF THE DRAWINGS

FIG. 5A is similar to FIG. 5 with portions cut away to show the feed wheel at a position associated with the carriage position of FIG. 5 wherein the feed wheel and gap-bounding member define therebetween a maximum throat opening.

FIG. 7 is a table showing the control of the feed wheel with respect to the size of the throat opening.

Similar numbers refer to similar parts throughout the specification.

DETAILED DESCRIPTION OF THE INVENTION

Figure 1:
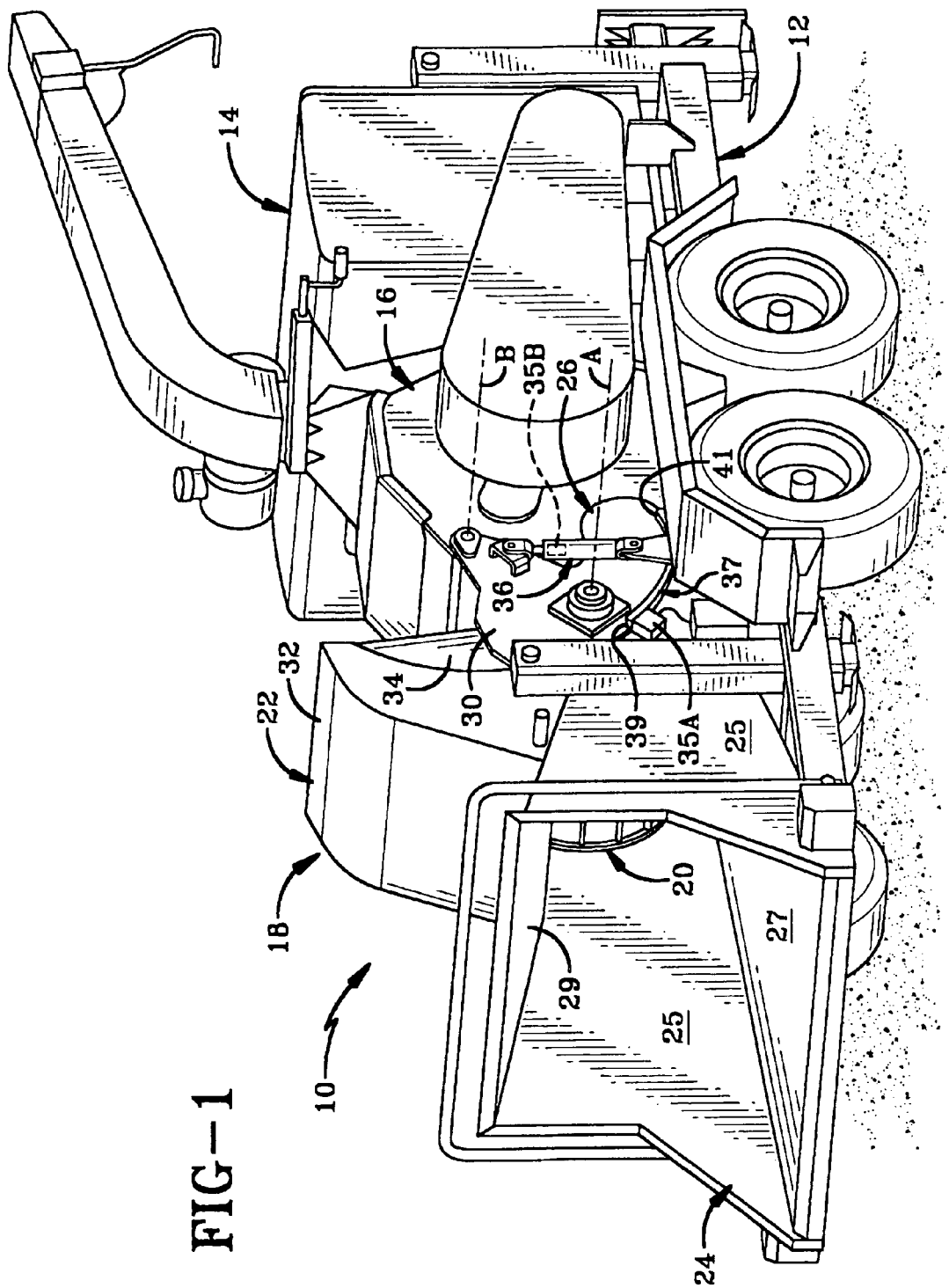
FIG. 1 is a perspective view of the wood chipper of the present invention.

The wood chipper of the present invention is indicated generally at 10 in FIG. 1. Wood chipper 10 is configured to control the rotation of the feed wheel thereof and the down pressure typically applied by the feed wheel in accordance with the size of the throat opening adjacent the feed wheel. In one preferred embodiment, wood chipper 10 is configured to apply increased force or pressure in a pulsating manner to feed material being fed into the wood chipper in order to improve the feeding characteristics thereof.

Wood chipper 10 is a wheeled vehicle having a frame 12 with an engine 14 mounted thereon. A cutting assembly 16 is mounted on frame 12 and is operatively connected to and powered by engine 14. A feed wheel assembly 18 is mounted on frame 12 adjacent cutting assembly 16 and opposite engine 14. Feed wheel assembly 18 includes a feed wheel 20 rotatably mounted within a feed wheel housing 22. A feed chute 24 is mounted adjacent feed wheel housing 22 whereby feed material may be fed through feed chute 24 into housing 22 and be drawn by feed wheel 20 into cutting assembly 16. Feed chute 24 includes a substantially flat bottom wall 27, a pair of spaced side walls 25 extending upwardly from bottom wall 27 and a top wall 29 extending between and connected to each of side walls 25. Side walls 25 and bottom wall 27 extend rearwardly to form respective portions of feed wheel housing 22. Feed wheel 20 is rotatably mounted on a carriage 26 about a first axis A which passes through an axle 28 of feed wheel 20. More particularly, carriage 26 includes a pair of carriage members 30 (only one shown) which are spaced from one another and disposed generally on either side of housing 22. Carriage 26 is pivotally mounted about an axis B which is substantially parallel to axis A. The pivotal mounting of carriage 26 allows for the pivotal movement of feed wheel 20 in a generally up and down direction. It is noted that while feed wheel 20 is oriented to rotate about a substantially horizontal axis and carriage 26 is also pivotal about a substantially horizontal axis, feed wheel 20, carriage 26 and the corresponding structure may be arranged so that the feed wheel and carriage respectively rotate and pivot about axes in different orientations. In addition, it is contemplated that a carriage may be movably mounted other than pivotally, such as along a linear path. Housing 22 includes a stationary portion 32 and a movable portion 34 which is rigidly mounted on carriage 26 and disposed between the spaced carriage members 30. Moveable portion 34 is thus moveable along with carriage 26 as it pivots about axis B.

Figure 2:
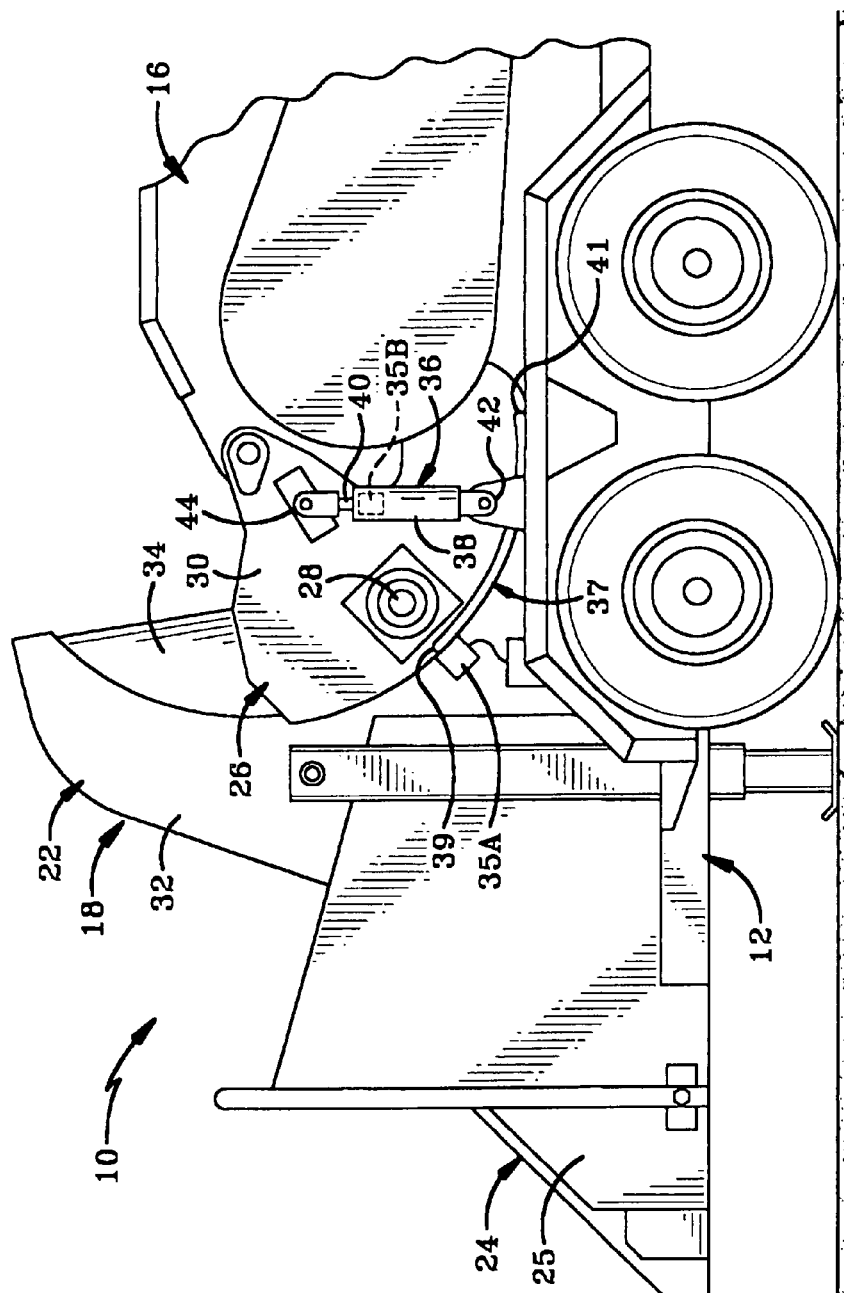
FIG. 2 is a fragmentary side elevational view showing the carriage on which the feed wheel is mounted and an actuator for moving the carriage in a generally up and down motion.

With reference to FIGS. 1 and 2, and in accordance with a feature of the invention, a throat opening or throat gap sensor 35A is mounted on feed wheel housing 22 and a reference strip 37 is mounted adjacent sensor 35A on carriage member 30 whereby strip 37 is moveable with respect to sensor 35A. With reference to FIG. 2, strip 37 is an elongated arc having first and second opposed ends 39 and 41. In FIG. 2, sensor 35A is adjacent first end 39 of strip 37. Strip 37 is thus moveable along with carriage 26 and consequently corresponds to the position of feed wheel 20. Sensor 35A may be of a variety of types known in the art, including mechanical and electronic sensors which are able to determine the relative position of strip 37. Wood chipper 10 further includes an actuator 36 in the form of a hydraulic piston-cylinder combination having a cylinder 38 and piston 40. Cylinder 38 is pivotally connected adjacent a first end 42 of actuator 36 to frame 12 and cylinder 38 is pivotally mounted adjacent a second end 44 of actuator 36 to carriage 26. Actuator 36 is extendable and retractable between a retracted position shown in FIG. 2 and a fully extended position shown in FIG. 5. Actuator 36 thus moves carriage 26 and feed wheel 20 via axle 28 with respect to frame 12 of wood chipper 10. An alternate throat gap sensor 35B may be disposed within actuator 36 in the form of a proximity sensor which determines the position of piston 40 with respect to cylinder 38 whereby sensor 35B is able to determine the position of feed wheel 20 and the throat opening or gap discussed below. An alternate sensor may use trigonometry to determine the size of the throat opening.

Figure 2A:
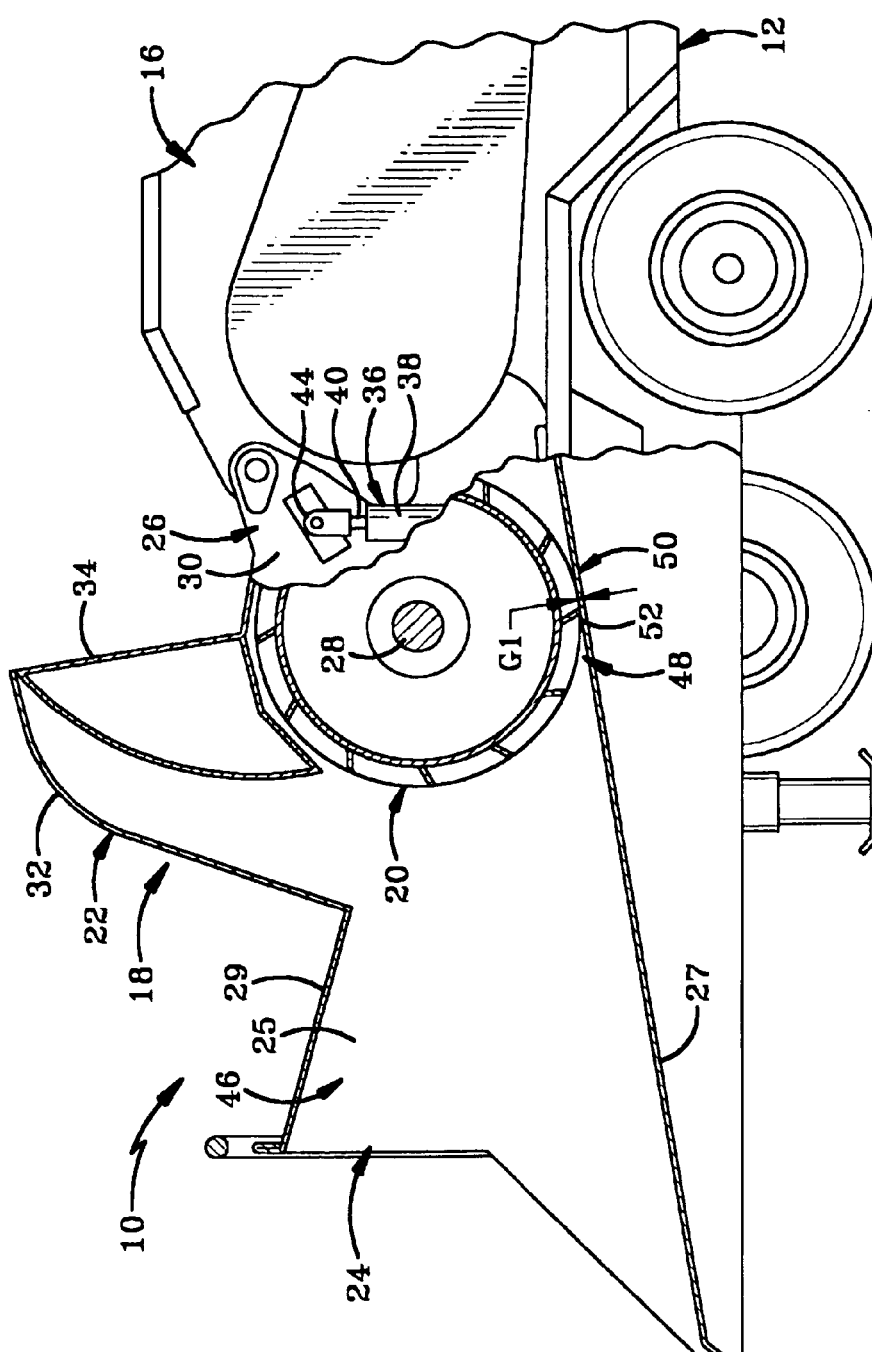
FIG. 2A is similar to FIG. 2 and has portions cut away to show a zero or minimal clearance between the feed wheel and the gap-bounding member.

With reference to FIG. 2A, walls 25, 27 and 29 of feed chute 24 define an input 46 which narrows toward cutting assembly 16 to a throat 48 disposed below feed wheel 20. Throat 48 is bounded by and defined by feed wheel 20 and portions of side walls 25 and bottom wall 27 of feed chute 24, which are more particularly portions of feed wheel housing 22. More particularly, bottom wall 27 includes a structural member in the form of a gap-bounding portion or member 50 and feed wheel 20 includes a point or line 52 on the outer perimeter thereof wherein gap-bounding member 50 and point 52 on feed wheel 20 define therebetween a distance or gap G1 which varies (FIGS. 3A, 4A and 5A) with the movement of feed wheel 20 in response to the extension and retraction of actuator 36. Gap G1 of FIG. 2A is zero or substantially zero and represents the narrowest or nearly the narrowest gap in accordance with a full or nearly full retraction of actuator 36. Increasingly larger gaps are shown at G2 in FIG. 3A, G3 in FIG. 4A and G4 in FIG. 5A, the latter representing the widest or nearly widest gap in accordance with a full or nearly full extension of actuator 36. For certain purposes of the present application, G2 represents a three inch gap, G3 represents a six inch gap and G4 represents a fifteen inch gap, although the gap sizes may vary.

Figure 3:
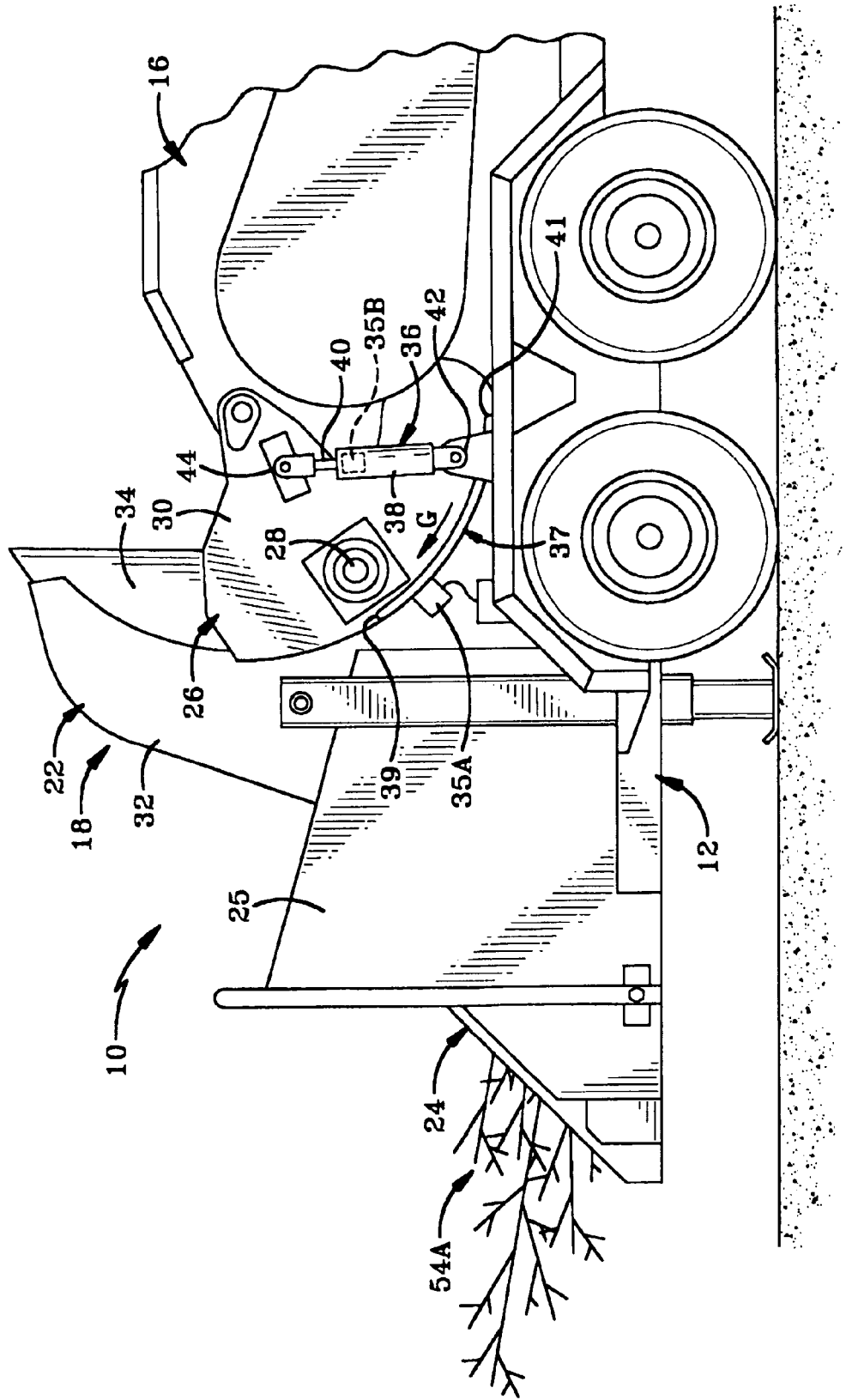
FIG. 3 is similar to FIG. 2 and shows the carriage having been moved from the zero clearance position of FIG. 2 to open the throat.
Figure 3A:
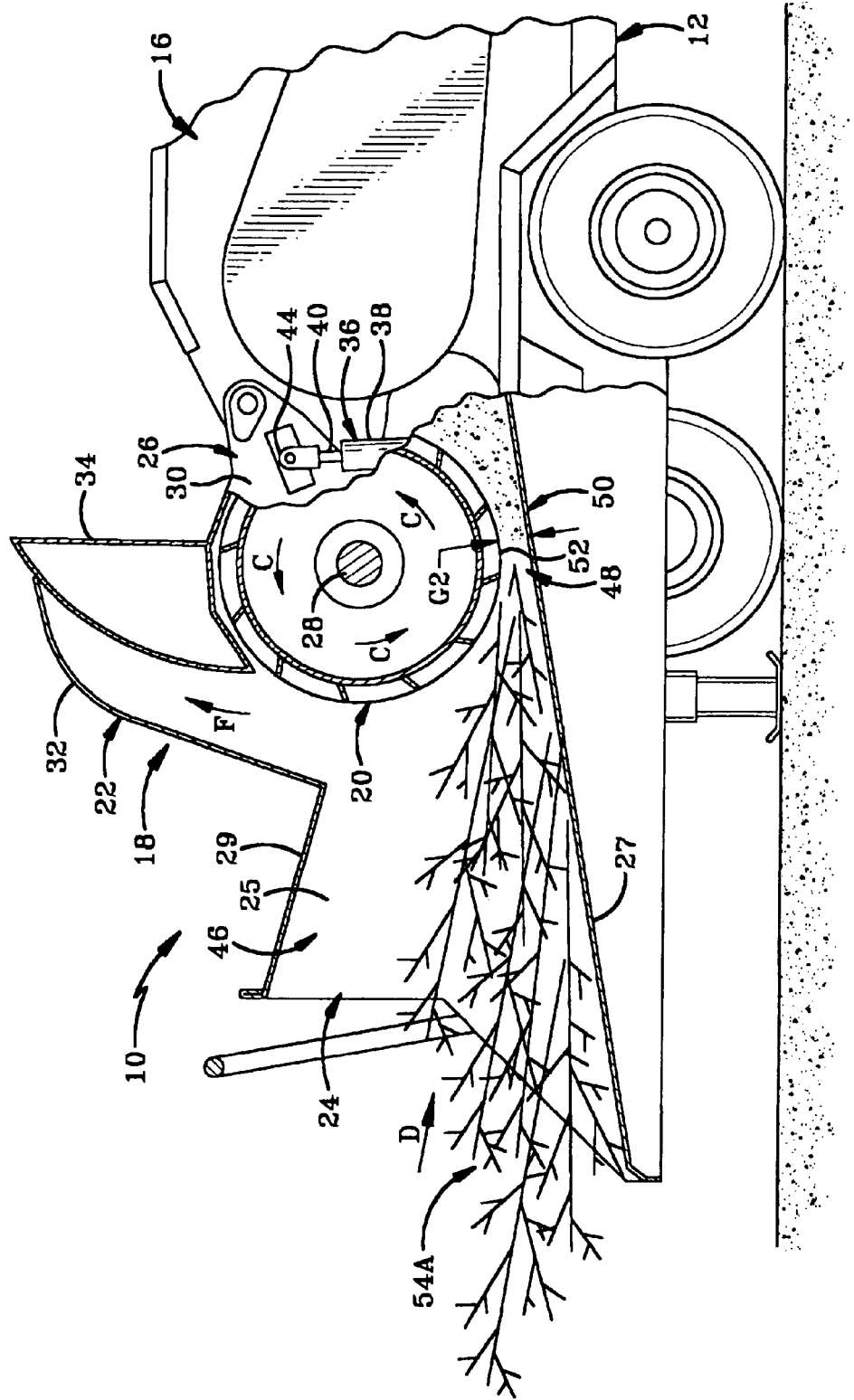
FIG. 3A is similar to FIG. 3 with portions cut away to show the position of the feed wheel associated with the position of the carriage of FIG. 3 wherein the feed wheel and gap-bounding member define therebetween a relatively small throat opening.

With reference to FIGS. 3-3A and in accordance with a feature of the invention, the feeding of material via feed wheel 20 is partially described. With feed wheel 20 rotating in the forward direction as indicated by Arrows C, a first amount of feed material 54A is fed (Arrow D) via input 46 of feed chute 24 into throat 48, adjacent which feed wheel 20 contacts a portion of feed material 54A and draws it through throat 48 toward cutting assembly 16. While feed material 54A is shown schematically as tree branches which may be large or small, various materials may be fed into wood chipper 10. As will be detailed further below, actuator 36 is operated to apply a downward force or down pressure via feed wheel 20. When feed material 54A is fed into wood chipper 10, material 54A engages feed wheel 20 and gap-bounding member 50 and overcomes this downward force on feed wheel 20 to a certain degree, thereby moving feed wheel 20 upwardly as indicated by Arrow F in FIG. 3A. As feed material 54A moves feed wheel 20 upwardly as indicated by Arrow F in FIG. 3A, measuring strip 37A is moved with carriage 26 in the direction indicated by Arrow G in FIG. 3 so that a length of strip 37 adjacent first end 39 moves past sensor 35A. Sensor 35A thus senses this movement which is associated with the movement of feed wheel 20 and by which gap G2 may be determined.

This upward movement of feed wheel 20 thus establishes gap G2, which as noted earlier is approximately three inches for the present purposes. Gap G2 thus represents a first threshold such that movement of feed wheel 20 is controlled in a first manner if the gap is less than the first threshold and in a second manner if the gap is greater than the first threshold. The various manners of controlling feed wheel 20 will be discussed in further detail subsequently. In general, if gap G2 is below the first threshold, feed wheel 20 will be rotated in a forward direction in a continuous manner and down pressure applied by feed wheel 20 on feed material 54A will be continuous and typically substantially constant.

Figure 4:
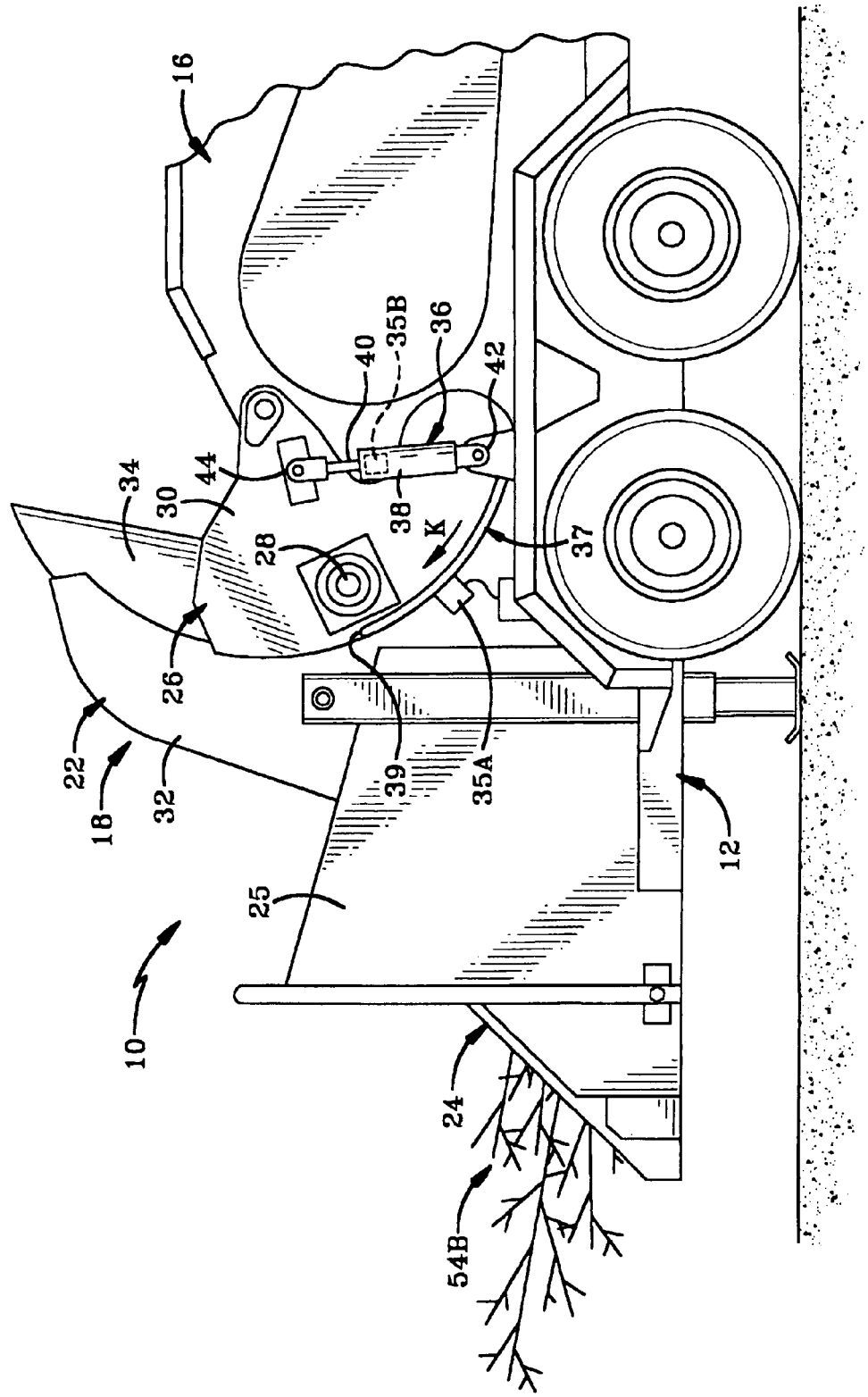
FIG. 4 is similar to FIG. 3 and shows the carriage having moved from the position of FIG. 3 to increase the size of the throat opening.
Figure 4A:
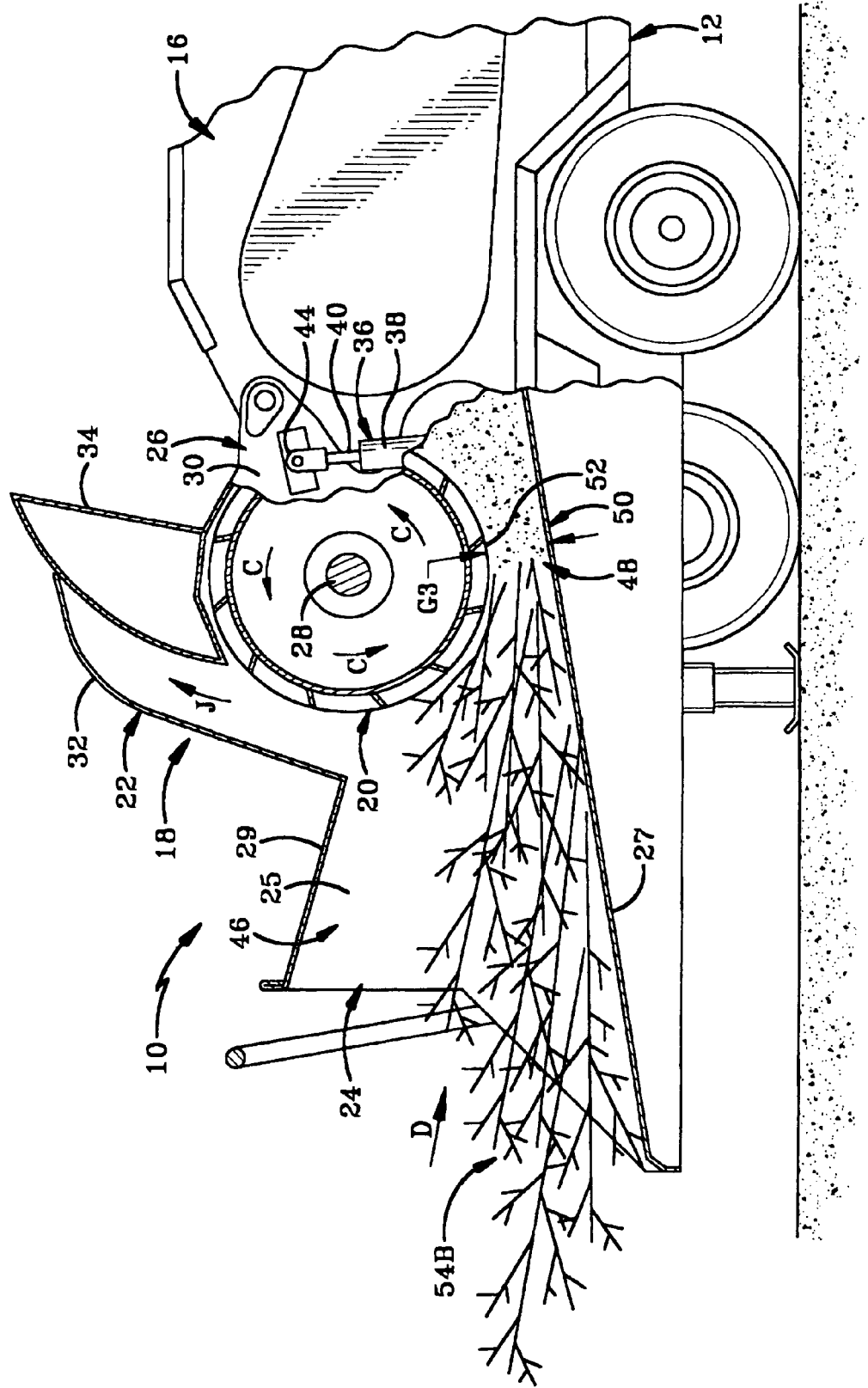
FIG. 4A is similar to FIG. 4 with portions cut away to show the position of the feed wheel associated with the position of the carriage of FIG. 4 wherein the feed wheel and gap-bounding member defined therebetween a throat opening which is larger than that of FIG. 3A.

With reference to FIGS. 4 and 4A, a second amount of feed material 54B is fed into feed chute 24 as indicated by letter D in FIG. 4A. Second amount of feed material 54B is generally larger than first amount 54A shown in FIGS. 3 and 3A. As a result, a portion of feed material 54B engages feed wheel 20 and gap-bounding member 50 and moves feed wheel 20 further upwardly as indicated by Arrow J in FIG. 3A to establish gap G3. As feed wheel 20 is moved upwardly, carriage 26 and measuring strip 37 are moved in the direction indicated by Arrow K in FIG. 4 so that an additional length of strip 37 moves past sensor 35A whereby sensor 35A detects this movement and the distance of gap G3 may be determined as discussed further below. Gap G3 generally represents a second threshold which is greater than the first threshold of gap G2 shown in FIG. 3A. Thus, when the feed wheel is in a position which is greater than gap G2 or the first threshold and less than gap G3 or the second threshold, the movement of feed wheel 20 is controlled in the second manner previously mentioned. One preferred second manner of controlling feed wheel 20 involves applying a continuous force which is substantially constant as was the case when the gap was less than the first threshold and also to rotate feed wheel 20 in a forward direction for a predetermined period of time and then reverse and/or stop rotation of feed wheel 20 for a second period of time which primarily serves either to prevent the operational speed of engine 14 and cutting assembly 16 from dropping below a desired value or allows the operational speed of engine 14 and cutting assembly 16 to recover to a desired value.

When the distance between feed wheel 20 and gap-bounding member 50 exceeds gap G3 or the second threshold, feed wheel 20 is controlled in a third manner which is different from each of the first and second manners described above. One preferred third manner includes rotating feed wheel 20 in a similar fashion as described with regard to the second manner such that feed wheel 20 is rotated in the forward direction for a first period of time and reversed and/or stopped for a second period of time. In addition, the preferred third manner includes applying pressure via feed wheel 20 toward gap-bounding member 50 and feed material 54B at a first force for a first predetermined amount of time and at a second force which is greater than the first force for a second predetermined amount of time whereby the first and second pressures are applied in an alternating or pulsating manner. Typically, the first period of time is substantially longer than the second period of time, as will be detailed further below.

With continued reference to FIG. 4A, and in accordance with a feature of the invention, actuator 36 may be operated to retract and extend in a pulsating manner at predetermined time intervals whereby feed wheel 20 is respectively lowered and raised at said time intervals. Actuator 36 is thus part of a pulsating mechanism for moving feed wheel 20 in a pulsating manner up and down as indicated by Arrow J and the reverse thereof in order to alternate the size of the gap of throat 48 between, for example, gap G2 and gap G3. It is noted that with respect to the up and down movement of feed wheel 20, gaps G2 and G3 are merely representative of two different gap sizes or distances which will vary in accordance with a particular scenario and depends upon the amount of force applied by actuator 36 as well as the type of feed material 54 being fed into wood chipper 10. Obviously, the more that feed material 54 gives in response to the pressure or force applied by actuator 36 via feed wheel 20, the more the gap will change. Thus, in some cases the gap will narrow and widen in an alternating fashion to different degrees whereas when the feed material is sufficiently sturdy and thus does not give, the gap may not change at all, at least not noticeably, in response to the amount of force applied. Whether or not the gap between feed wheel 20 and gap-bounding member 50 changes in response to the force applied via actuator 36, the downward force or pressure will allow feed wheel 22 to better grip or grasp feed material 54 in order to facilitate pulling feed material 54 toward cutting assembly 16. In most cases, the force applied by actuator 36 will move feed wheel 20 up and down and this is particularly useful for feed material in the form of branches because the downward movement of feed wheel 20 is sufficient to break or crush Y-branches or crotches as they are known in the art, and the upward movement prevents the stalling of engine 14 and allows it, if necessary, to recover to a suitable operational speed. This facilitates the feeding of the feed material into wood chipper 10.

As previously noted, the pulsating motion of feed wheel 20 occurs at predetermined time intervals. Thus, the intermittent time periods that feed wheel 20 remains in a relatively lowered position are predetermined as well as the intermittent time periods that feed wheel 20 remains in a relatively raised position. Most commonly, actuator 36 is controlled to apply a first relatively lesser or normal force or pressure via feed wheel 20 toward feed material 54 and then at regular time intervals actuator 36 is retracted at a predetermined amount of force to apply a relatively greater force to feed wheel 20 and feed material 54 for relatively short time periods in comparison with the time periods that the normal pressure is applied.

Figure 5:
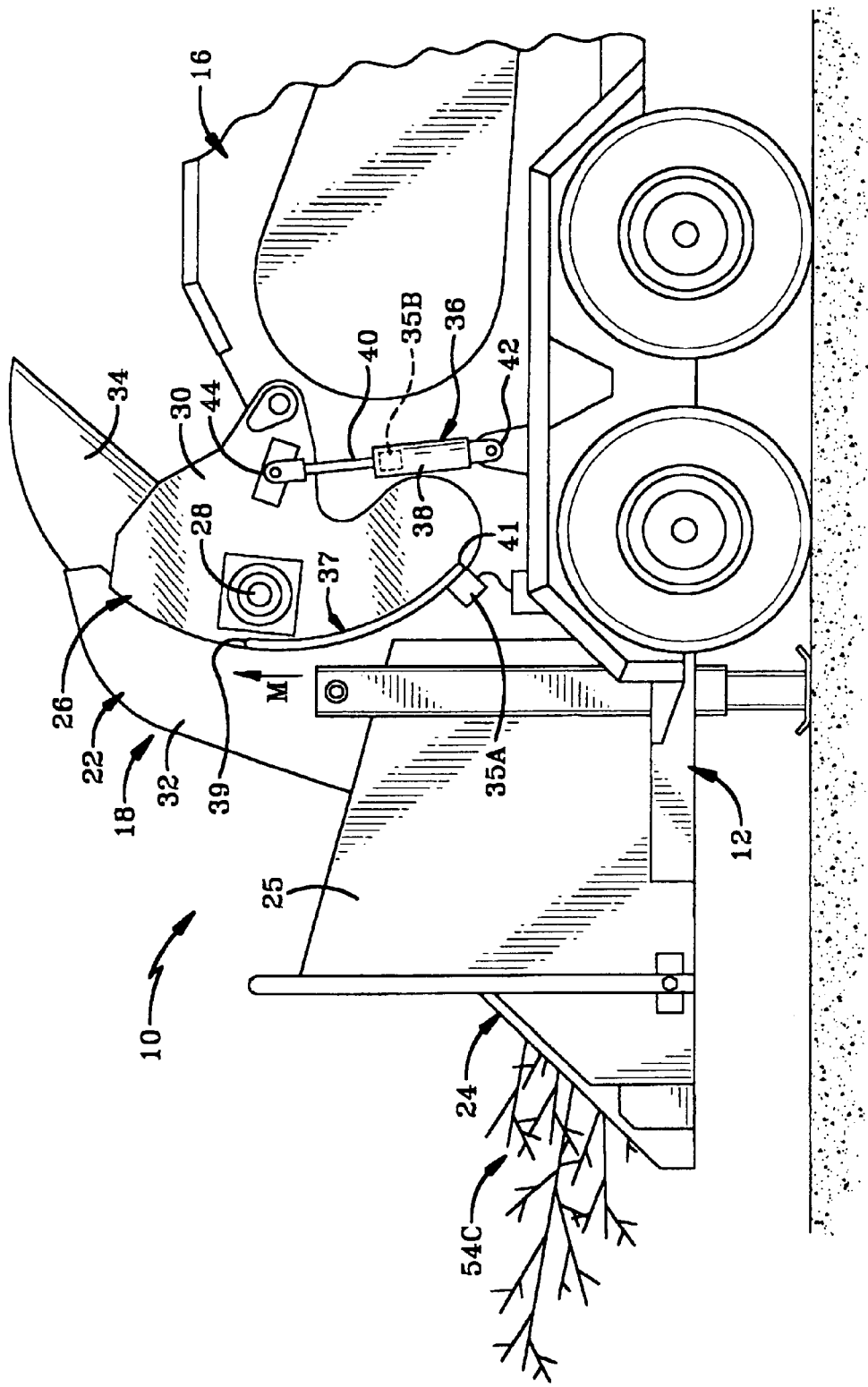
FIG. 5 is similar to FIG. 4 and shows the carriage having moved to a maximum height to provide a maximum throat opening.

With reference to FIGS. 5 and 5A, a third amount of feed material 54C is fed into feed chute 24 as indicated by Arrow D in FIG. 5A. Third amount of feed material 54C is larger than second amount 54B shown in FIGS. 4 and 4A and thus further moves feed wheel 20 upwardly as indicated by Arrow L in FIG. 5A to form a gap G4 between feed wheel 20 and gap-bounding member 50. As feed wheel 20 moves upwardly, carriage 26 and strip 37 move as indicated by letter M in FIG. 5 so that an additional length of strip 37 moves past sensor 35A and second end 41 of strip 37 is disposed adjacent sensor 35A. Sensor 35A senses this movement so that the distance of gap G4 may be determined. Gap G4 represents a maximum gap which can be achieved with wood chipper 10.

The exemplary embodiment in the figures includes a single feed wheel although it is common within the art to have a pair of feed wheels. Thus, it is noted that the gap-bounding member represented at 50 may also be a lower feed wheel so that the gap is defined between the upper and lower feed wheels. In addition, it is noted that the exemplary embodiment shows the feed wheel being movable in order to change the size of the gap during the pulsating movement of the feed wheel. However, it is within the scope of the invention that a gap-bounding member like member 50 or a second feed wheel acting as the gap-bounding member may be movable instead of the feed wheel shown or in addition to movement of the feed wheel as shown in the figures. Thus, while it may be preferred and easier to move the feed wheel to change the gap or to move the upper feed wheel in a wood chipper having a pair of feed wheels, at least one of the gap-bounding member and the feed wheel will be movable toward one another in order to effect the pulsating movement required for the invention.

Figure 6:
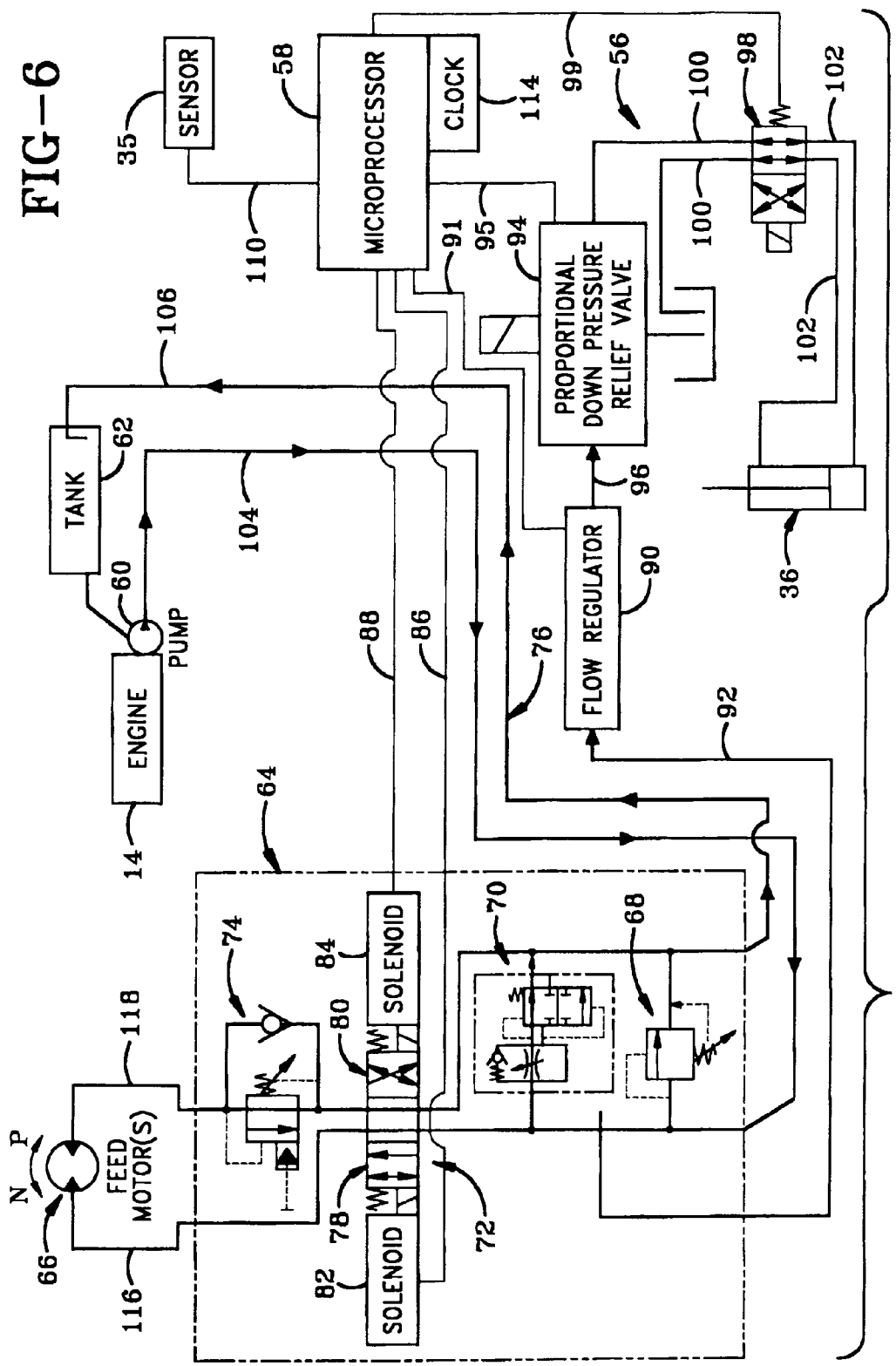
FIG. 6 is a diagrammatic view of the control system of the present invention.

With reference to FIG. 6 and in accordance with another feature of the invention, wood chipper 10 further includes a hydraulic system 56 and an electronic control unit (ECU) 58 as shown as a microprocessor which controls the various hydraulic and related elements in order to produce the desired movement of feed wheel 20. Hydraulic system 56 includes a hydraulic pump 60 which is powered by engine 14. Hydraulic system 56 further includes a reservoir or tank 62, a valve block 64 and one or more hydraulic feed motors 66. Valve block 64 includes a relief valve 68, a flow regulator or flow control valve 70, a directional control valve assembly 72 and a counterbalance valve 74. These various elements of the hydraulic system 56 are interconnected by hydraulic lines as generally indicated at 76. Directional control valve assembly 72 includes a first or forward directional control valve 78 and a second or reverse directional control valve 80. A first or forward solenoid 82 is operatively connected to forward directional control valve 78 and a second or reverse solenoid 84 is operatively connected to a reverse directional control valve 80. First solenoid 82 is in electrical communication with microprocessor 58 via a first electrical circuit 86. Likewise, second solenoid 84 is in electrical communication with microprocessor 58 via a second electrical circuit 88. Hydraulic system 56 further includes a flow regulator 90 in fluid communication with valve block 64 via hydraulic line 92, a proportional down pressure relief valve 94 in fluid communication with regulator 90 via hydraulic line 96, an actuator control valve 98 in fluid communication with relief valve 94 via hydraulic lines 100 and actuator 36, which is in fluid communication with control valve 98 via hydraulic lines 102. Microprocessor 58 is in electrical communication with flow regulator 90 via a regulator electric circuit 91, with relief valve 94 via a relief valve electric circuit 95 and with control valve 98 via a control valve electric circuit 99 via a solenoid.

With continued reference to FIG. 6, the control system of wood chipper 10 includes sensor 35 for sensing the distance or gap (G1-G4) between feed wheel 20 and gap-bounding member 50. Sensor 35 is in electrical communication via a sensor electrical circuit 110 with ECU 58. The control system further includes a timing device in the form of a clock 114 which is in electrical communication with ECU 58. ECU 58 may be in communication with the various components other than by electrical circuits, for example, radio frequency or other suitable mechanisms.

With continued reference to FIG. 6, the operation of hydraulic system 56 is described. Pump 60 is powered by engine 14 to pump hydraulic fluid through a feed line 104 to valve block 64. Hydraulic fluid is returned from valve block 64 via a return line 106 to tank 46. When first and second directional control valves 78 and 80 are properly configured, hydraulic fluid flows via hydraulic lines 116 and 118 in order to rotate feed motor 66 in either a forward direction as indicated at Arrow N or a reverse direction as indicated at Arrow P to respectively rotate feed wheel 20 in the forward direction (Arrows C in FIGS. 3A, 4A and 5A) or the reverse direction.

With continued reference to FIG. 6, microprocessor 58 controls activation and inactivation of valves 78 and 80 in order to control feed motor 66 to rotate in the forward direction, rotate in the reverse direction or to stop and remained stopped as long as desired. More particularly, microprocessor 58 sends an electrical signal to activate solenoid 82, which in turn activates valve 78 to allow the flow of hydraulic fluid from feed line 104 into hydraulic line 116 in order to rotate feed motor 66 in the forward direction indicated by Arrow N. Similarly, microprocessor 58 sends an electrical signal via circuit 88 to activate solenoid 84, which in turn activates second directional control valve 80. Activation of valve 80 allows hydraulic fluid to flow from feed line 104 into hydraulic line 118 in order to rotate feed wheel 66 in a reverse direction indicated by Arrow P. It is noted that first and second control valves 78 and 80 are operated in the alternative. That is, in order to rotate feed motor 66 in a forward direction, microprocessor 58 activates first solenoid 78 while second solenoid 84 and second valve 80 remain in or are moved to their respective inactivated positions. To rotate feed motor 66 in the reverse direction, the reverse is true so that microprocessor 58 activates solenoid 84 while solenoid 82 is inactivated. In order to stop the rotation of feed motor 66 in either direction, microprocessor 58 opens circuits 86 and 88 so that solenoids 82 and 84 are each inactivated and valves 78 and 80 are likewise inactivated. In this inactivated state, no hydraulic fluid flows through lines 116 and 118 and therefore feed motor 66 stops rotating.

With continued reference to FIG. 6 and in accordance with a feature of the invention, microprocessor 58 controls the flow of hydraulic fluid through flow regulator 90, proportional relief valve 94, control valve 98 and actuator 36 in order to control the pulsating or other force applied by actuator 36 in either an extended or retracted direction thereof in order to control the pulsating or other force applied to and movement of feed wheel 20 as previously discussed. More particularly, microprocessor 58 controls relief valve 94 via circuit 95 in order to alter the amount of hydraulic fluid flowing from regulator 90 through control valve 98 to actuator 36 in order to control the amount of force upon feed wheel 20 via actuator 36. Thus, flow regulator 90 maintains a given amount of flow of hydraulic fluid and relief valve 94 dumps hydraulic fluid in a proportional manner controlled by microprocessor 58 in order to control the amount of fluid going to actuator 36 and thus the amount of force applied to feed material 54 via feed wheel 20. Directional control valve 98 controls the direction of flow of hydraulic fluid through lines 102 and thus determines whether piston 40 of actuator 36 will be extended or retracted. Alternately, microprocessor 58 may control a flow regulator such as regulator 90 in order to control the amount of fluid going to actuator 36 without the use of a relief valve like valve 94. A variety of other configurations and methods may be used to control the down pressure applied by actuator 36, to include the use of potentiometers, in-line resistors, a modulated signal from the microprocessor or any other suitable mechanisms known in the art. Microprocessor 58 is configured with a logic circuit which controls hydraulic system 56 generally, to include information from clock 114 in order to control the predetermined time intervals for the movement or application of pulsating or other force to feed wheel 20 via actuator 36.

Thus, ECU 58 and hydraulic system 56 are configured to control the movement of feed wheel 20 in virtually any manner desired. For example, feed wheel 20 may be rotated in a forward direction in a continuous manner or for a given period of time. In addition, the rotation of feed wheel 20 may either be stopped or reversed for any desired period of time. In addition, actuator 36 may be operated in order to apply a down pressure via feed wheel 20 in any manner desired. As previously noted, one preferred embodiment involves the application of force via feed wheel 20 in a pulsating manner. In addition, feed wheel 20 may apply a continuous and substantially constant down pressure if desired. However, feed wheel 20 may also be operated to provide varying pressures which are not applied in a pulsating or alternating manner. For instance, feed wheel 20 may be operated to apply a first force or pressure for a first period of time and subsequently a second force for a second period of time wherein the second force is different from the first force. Likewise, a third force may be subsequently applied which is different from each of the first and second forces. The time periods for which these various forces may be applied are infinitely variable. Thus, for example, the second force may be greater than the first force and the third force may be greater than the second force, or to the contrary, the second force may be less than the first force and the third force less than the second force. In addition, the various forces may be substantially constant during the time they are applied or they may gradually increase or decrease.

With reference to FIG. 7 and in accordance with a feature of the invention, a preferred manner of controlling feed wheel 20 with ECU 58 is described. More particularly, the table of FIG. 7 shows a preferred feed wheel operating plan which is based on the size of the throat opening or gap defined between the feed wheel and the gap-bounding member as previously discussed. The table of FIG. 7 includes a column 120 which indicates the throat opening sensor feedback or the size of the gap. Second column 122 indicates the forward feed cycle time or forward rotation time of feed wheel 20. Third column 124 indicates the reverse feed cycle time or reverse rotation cycle time of feed wheel 20. Fourth column 126 indicates a pause or dwell cycle time of feed wheel 20. Fifth column 128 indicates the amount of time that feed wheel 20 is operated at a normal or first down pressure. A sixth column 130 indicates the amount of time that feed wheel 20 is operated at a high down pressure. The operational parameters within columns 122, 124, 126, 128 and 130 are dependent upon the size of the gap or throat opening indicated in column 120.

With reference to column 120, when the throat opening or gap is one to three inches, feed wheel 20 is operated in the forward direction in a continuous manner as indicated in column 122 and at a continuous and substantially constant normal down pressure as indicated at column 128. In this preferred manner of operation, three inches is the first threshold, as discussed previously with regard to gap G3 in FIG. 4A. FIG. 7 more broadly represents that when the gap is anywhere from nearly zero to three inches, feed wheel 20 will operate in a forward direction continuously at a normal down pressure which is continuous. This is in keeping with the relatively small amount of feed material represented at 54A in FIG. 3A or 54B in FIG. 4A which can generally be handled by wood chipper 10 with a continuous forward rotation of feed wheel 20 and a continuous normal down pressure thereof. However, when the throat opening or gap increases above this first threshold, it is preferred to operate feed wheel 20 in a different manner. As previously discussed and as shown in FIG. 7, once the throat opening or gap is greater than the first threshold or three inches, feed wheel 20 is operated in a forward direction for a certain period of time as indicated in column 122 and then reversed and/or stopped for a certain period of time, as indicated in columns 124 and 126.

As previously discussed, there is a second threshold of the gap or throat opening at which the movement of feed wheel 20 generally changes. In the present example, the second threshold is at six inches. Thus, the table of FIG. 7 indicates that when a throat opening is four inches or five inches, which corresponds to a gap which is between the first and second threshold, feed wheel 20 will be rotated in a forward direction for ten seconds, reversed for 0.5 seconds and stopped for four seconds while operating at a continuous and normal down pressure. Once the throat opening reaches or exceeds the second threshold, which is six inches in the present illustration, ECU 58 controls feed wheel 20 to apply the normal down pressure for a first period of time and a higher down pressure for a second period of time which is typically less than the first period.

As shown in FIG. 7, this is true for all throat opening sizes which are six inches or greater. As column 122 in FIG. 7 shows, the amount of forward feed cycle time of feed wheel 20 generally decreases as the throat opening increases. In addition, column 126 shows that at the largest throat openings of 14 and 15 inches, the dwell time of feed wheel 20 is increased from four seconds to five seconds. At those same largest throat opening sizes, column 128 shows that the amount of time that the normal down pressure is applied is reduced from six seconds to four seconds and column 130 shows that the amount of time that the high down pressure is applied is increased from 1 second to 1.5 seconds. While these time periods may vary, these time ranges provide an example of the type of cycle which will allow for an increased down pressure which will not stall the engine due to the increased load translated from feed wheel 20 during this increased down pressure. Typically, the increased down pressure is maintained for no more than 2-second time periods and the normal down pressure for no more than 10-second time periods when in a pulsating mode. In addition, the normal down pressure time periods are typically from two to ten times as long as the increased down pressure time periods and preferably two to six times as long when in the pulsating mode.

Figure 8:
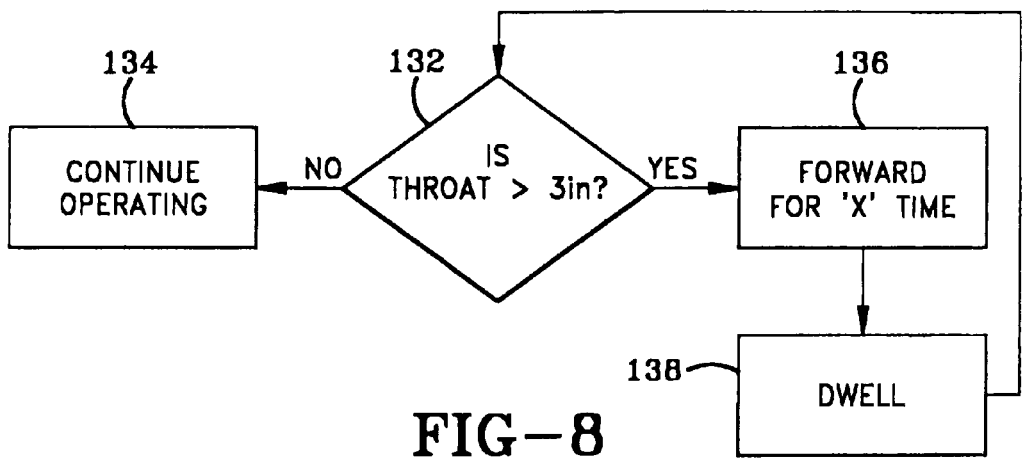
FIG. 8 is a flow chart related to the rotational control of the feed wheel which is dependent on a threshold size of the throat opening.

Various patterns of controlling feed wheel 20 with ECU 58 in accordance with the size of the throat opening or gap are described with reference to FIGS. 8-11. Certain portions of the process shown in FIGS. 8-11 are repeated and are thus numbered accordingly. With reference to FIG. 8, ECU 58 determines via sensor 35 and circuit 110 (FIG. 6) whether the throat opening or gap is greater than three inches or the first threshold as indicated at 132. If not, feed wheel 20 continues operating as shown at 134 with continuous forward rotation and continuous normal down pressure. If the throat opening is greater than three inches, ECU 158 controls feed wheel 20 to rotate forward for a predetermined period of time as indicated at block 136 and then to dwell or stop rotating as indicated at block 138.

Figure 9:
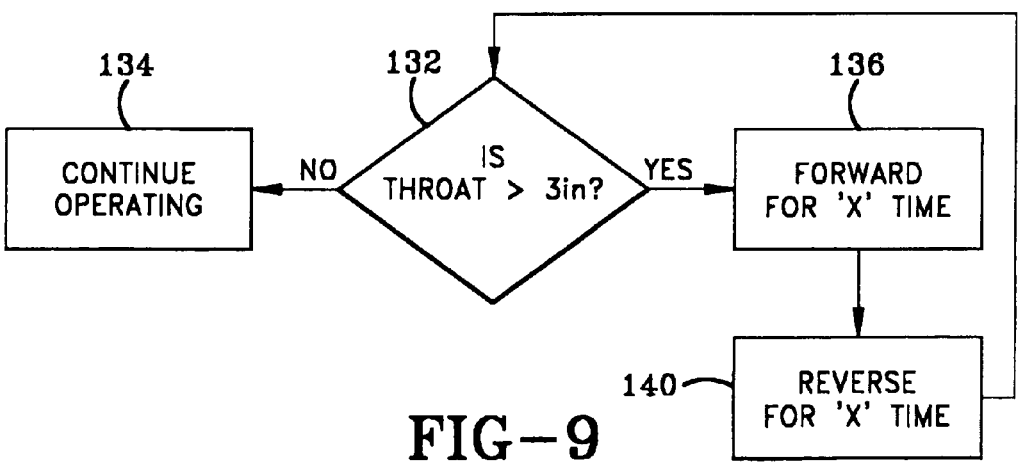
FIG. 9 is a flow chart which is similar to FIG. 8 and shows a second option of controlling the rotational movement of the feed wheel.

Alternately and with reference to FIG. 9, feed wheel 20 may be operated in a slightly different manner. The same steps occur in blocks 132, 134 and 136 of FIG. 9 as discussed with reference to FIG. 8. However, block 140 of FIG. 9 shows that feed wheel 20 may be operated in reverse rotation for a predetermined period of time instead of dwelling or stopping the rotation as indicated at block 138 of FIG. 8. As previously noted with reference to FIG. 7, ECU 58 may control feed wheel 120 to reverse and stop rotating if desired.

Figure 10:
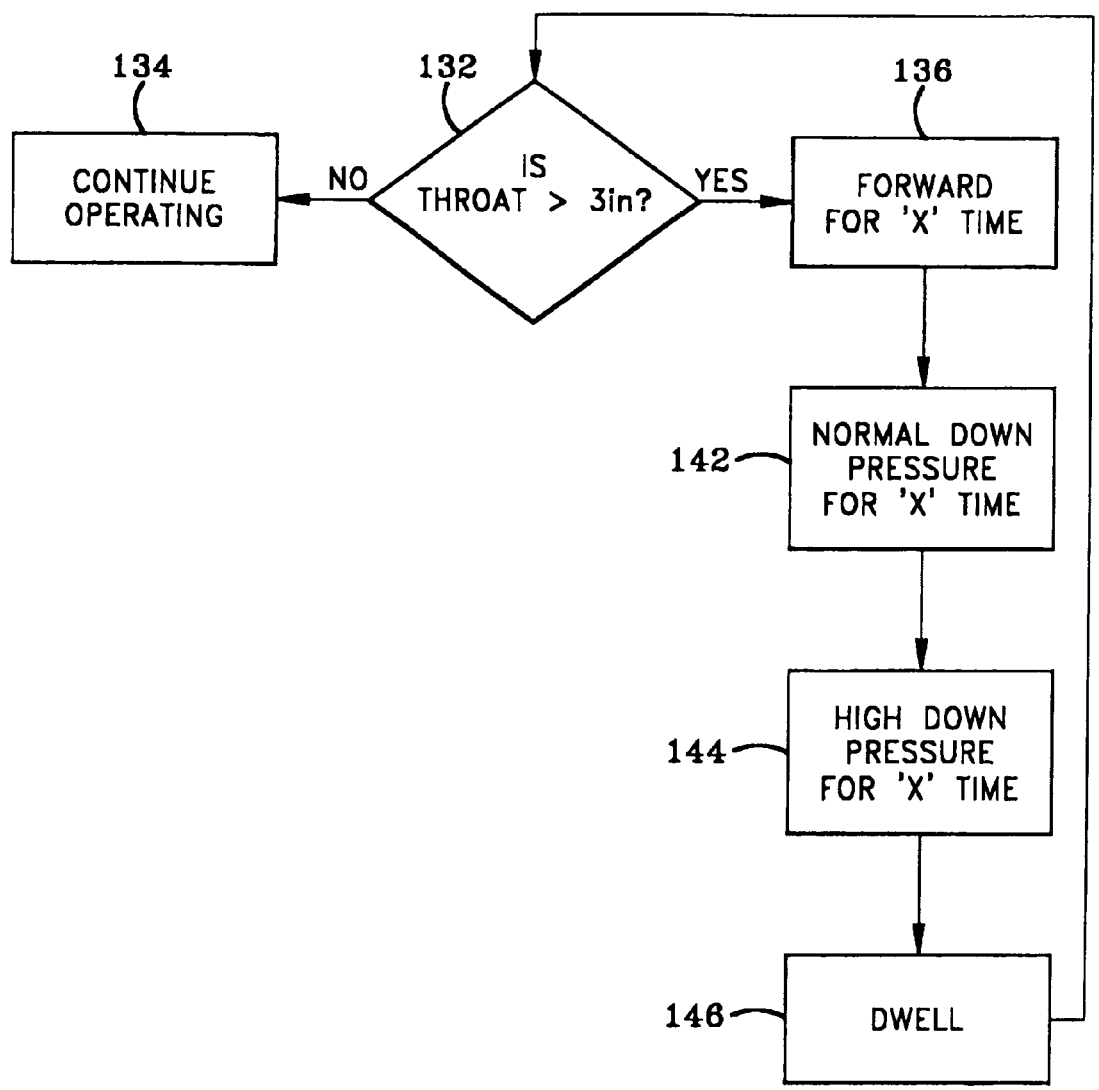
FIG. 10 is a flow chart which is similar to FIG. 8 and further indicates control of the down pressure of the feed wheel.
Figure 11:
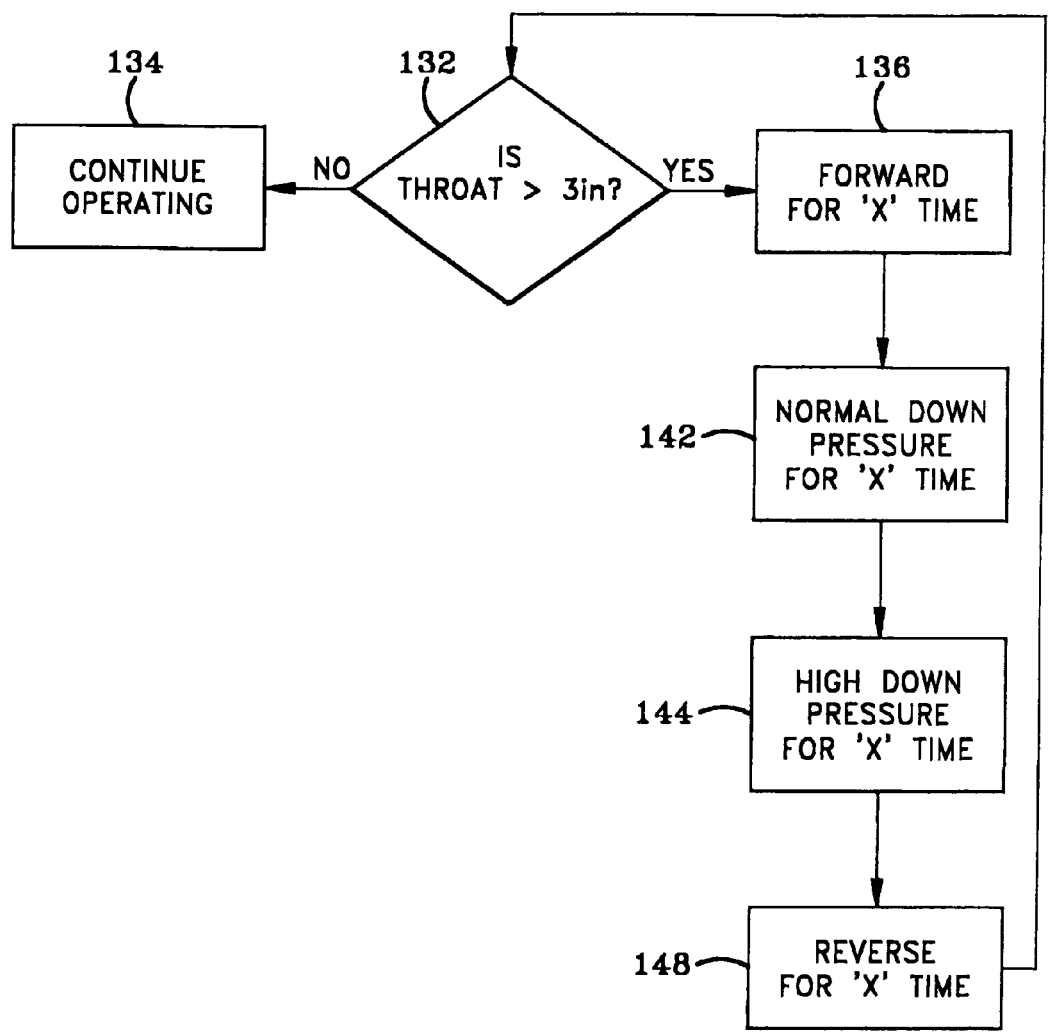
FIG. 11 is similar to FIG. 10 and shows an alternate version thereof.

With reference to FIG. 10, the procedure shows additional control of feed wheel 20 with regard to the pressure applied thereby to the feed material. More particularly, FIG. 10 also shows the same first three blocks 132, 134 and 136 as discussed with regard to the process of FIGS. 8 and 9. The process of FIG. 10 further adds that during the forward rotation of feed wheel 20 for the predetermined period of time as indicated at block 136, feed wheel 20 is operated at a normal down pressure for a predetermined period of time as indicated at 142 and subsequently at a high or higher down pressure for a predetermined period of time as indicated at block 144. Typically, the normal down pressure and higher down pressure are applied in an alternating fashion. Once the periods of normal and higher down pressure are completed, ECU 58 stops the rotation of feed wheel 20 as indicated at 146. FIG. 11 shows the same process as discussed with regard to FIG. 10 except that instead of stopping rotation as indicated at 146 in FIG. 10, the feed wheel is reversed for a predetermined period of time as indicated at block 148 in FIG. 11. As previously noted, ECU 58 may control feed wheel 20 to both reverse and stop rotation of feed wheel 20 if desired.

Thus, wood chipper 10 provides a control system which controls the movement of feed wheel 20 in light of the gap between feed wheel 20 and the gap-bounding member 50, the gap typically being set in a variable manner by the size of the feed material which is fed into and cut by wood chipper 10. ECU 58 is thus programmed to control the rotation and down pressure of feed wheel 20 in response to a signal from the throat opening sensor indicating the size of the gap which of course correlates to the size of the feed material being fed therethrough. Thus, ECU 58 may be programmed to control the movement of feed wheel 20 in a first manner associated with a first relatively small range of throat opening sizes, and a second manner related to a second range of throat opening sizes which is larger than the first, and so forth. ECU 58 is thus pre-programmed to optimize the rotation of feed wheel 20 and down pressure applied thereby in accordance with the size of the feed material.

While the exemplary embodiment shows the gap being defined between feed wheel 20 and gap-bounding member 50, the variable gap or distance which is measured by a sensor such as sensor 35A or 35B may involve the use of members which may be separate from feed wheel 20 and gap-bounding member 50. For example, a first member and a gap-bounding member may be disposed upstream of feed wheel 20 and gap-bounding member 50 so as to define therebetween the gap at issue. Thus, at least one of these upstream members is movable with respect to the other so as to define a variable gap therebetween which may be measured by the sensor. In such a case, at least one of feed wheel 20 and gap-bounding member 50 would be controlled in light of the distance measured between this alternate first member and alternate gap-bounding member. In such a scenario, gap-bounding member 50 may be thought of in terms of being a structural member whereby feed material is fed between feed wheel 20 and the structural member while the gap or distance sensed by sensor 35 would be the distance between the first member and the alternate gap-bounding member. A similar option is to use a first member other than feed wheel 20 and to define the gap between the first member and gap-bounding member 50. Alternately, the gap may be measured between feed wheel 20 and an alternate gap-bounding member. Thus, the invention contemplates a variable-size throat opening or gap which may be defined between the feed wheel 20 and gap-bounding member 50; between a pair of members that are separate therefrom; or between one of feed wheels 20 and gap-bounding member 50 and another member. With this in mind, it will be understood that the feed material 54 may be fed into feed chute 24 to engage and move at least one of these alternate members to establish the distance of the gap therebetween, and the control system of the wood chipper may be configured to control feed wheel 20 and gap-bounding member 50 in light of this distance.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method comprising the steps of:
    moving feed material toward a cutting assembly of a wood chipper through a variable-size gap;
    determining the size of the gap with a sensor having an output;
    reading the sensor output;
    determining based, at least in part, on the sensor output a gap range;
    determining when the gap range exceeds a first threshold;
    wherein when the gap range does not exceed the first threshold:
        rotating a feed wheel in a forward direction; and
        applying a normal downward pressure on the feed wheel;
    wherein when the gap range exceeds the first threshold:
        alternating between rotating the feed wheel forward for a first forward window of time and rotating the feed wheel in a reverse direction for a reverse window of time; and
        applying the normal downward pressure on the feed wheel.

2. The method of claim 1 wherein the step of moving includes the step of moving feed material through a gap which is disposed between the feed wheel and a gap-bounding member and which is adjustable by changing a distance from the feed wheel to the gap-bounding member; and wherein the step of determining the size of the gap includes the step of determining the distance.

3. The method of claim 1 further comprising:
    pausing the feed wheel after rotating the feed wheel in a reverse direction.

4. The method of claim 1 wherein the step of applying the normal downward pressure when the gap range exceeds the first threshold includes the step of applying the normal downward pressure in a pulsating manner while rotating the feed wheel in the reverse direction.

5. The method of claim 1 wherein each of the steps of applying the normal downward pressure includes the step of applying the normal downward pressure via at least one of the feed wheel and a gap-bounding member toward the other of the feed wheel and the gap-bounding member.

6. The method of claim 5 wherein the step of applying the normal downward pressure when the gap range exceeds the first threshold includes the step of applying a variable force via at least one of the feed wheel and the gap-bounding member.

7. The method of claim 6 wherein the step of applying a variable force includes the step of applying force via at least one of the feed wheel and the gap-bounding member in a pulsating manner.

8. The method of claim 7 wherein the normal downward pressure is applied for a normal pressure window of about six seconds.

9. The method of claim 1 wherein the first forward window of time is about 10 seconds and the reverse window of time is about half a second.

10. The method of claim 9 wherein the first threshold is about three inches.

11. The method of claim 1 wherein the first forward window of time is different from the reverse window of time.

12. The method of claim 1 wherein the step of determining a gap range further comprises determining a gap range corresponding to one of a first predetermined range and a second predetermined range, wherein the step of moving feed material includes the step of engaging the feed wheel and a gap-bounding member with the feed material to move at least one of the feed wheel and the gap-bounding member away from the other of the feed wheel and gap-bounding member to establish at least one of a first size associated with the first range and a second size associated with the second range.

13. The method of claim 12 wherein the step of moving includes the steps of moving a first amount of feed material through the gap and engaging the feed wheel and the gap-bounding member therewith to establish the first size, and moving a second amount of feed material through the gap and moving at least one of the feed wheel and the gap-bounding member toward the other of the feed wheel and gap-bounding member as the second amount moves through the gap to establish the second size.

14. The method of claim 1 wherein when the gap range exceeds a second threshold further comprising:
    alternating between rotating the feed wheel forward for the first forward window of time and rotating the feed wheel in the reverse direction for the reverse window of time; and
    alternating between applying the normal downward pressure on the feed wheel for a first normal pressure window of time and applying a high downward pressure for a first high pressure window of time.

15. The method of claim 14 wherein the first high pressure window of time is different than the first normal pressure window of time.

16. The method of claim 14 wherein the step of applying the normal downward pressure when the gap range exceeds the first threshold includes the step of applying a substantially constant force via at least one of the feed wheel and the gap-bounding member toward the other of the feed wheel and the gap-bounding member in a continuous manner; and wherein the step of applying the high downward pressure includes the step of applying force via at least one of the feed wheel and the gap-bounding member toward the other of the feed wheel and the gap-bounding member in a variable manner.

17. The method of claim 14 wherein when the gap range exceeds a third threshold:
   alternating between rotating the feed wheel forward for a second forward window of time and rotating the feed wheel in the reverse direction for a second reverse window of time; and
   alternating between applying the normal downward pressure on the feed wheel for a second normal pressure window of time and applying the high downward pressure for a second high pressure window of time.

18. The method of claim 17 wherein the first threshold is about three inches, the second threshold is about six inches and the third threshold is about 14 inches.

19. The method of claim 17 wherein the second normal pressure window of time is less than the first normal pressure window of time and the second high pressure window of time is longer than the first high pressure window of time.

20. The method of claim 19 wherein the second normal pressure window of time is about four seconds, the first normal pressure window of time is about 6 seconds, the second high pressure window of time is about 1.5 seconds and the first high pressure window of time is about one second.

* * * * *